Sept. 23, 1958  S. J. O'NEIL  2,853,699
DIGITAL-TO-ANALOGUE SHAFT POSITION TRANSDUCER
Filed Feb. 17, 1954  5 Sheets-Sheet 1
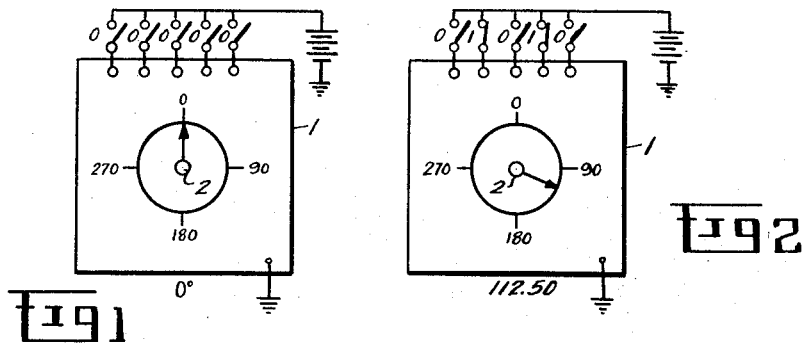
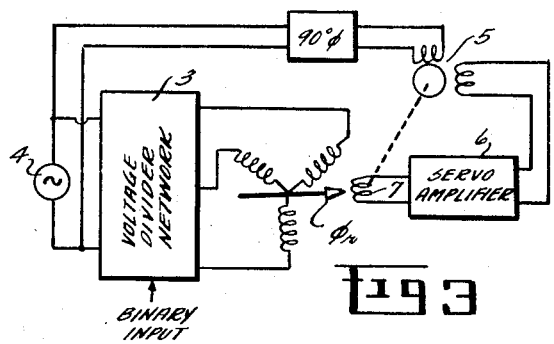
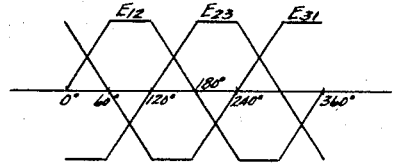
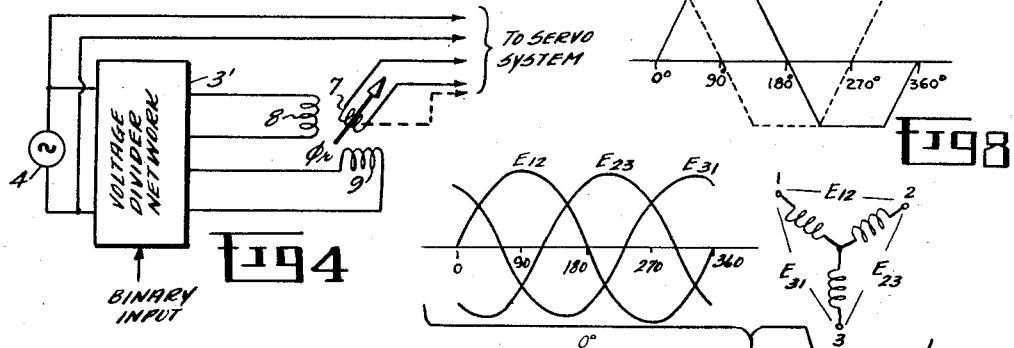
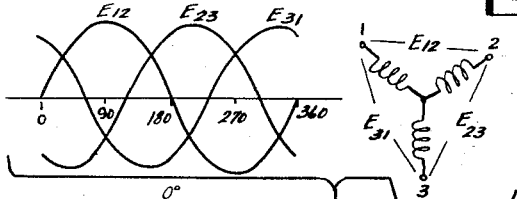
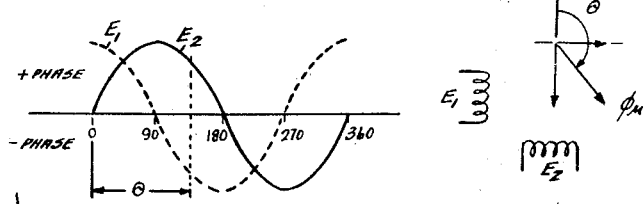
INVENTOR.
STEPHEN J. O'NEIL
BY James S. Shannon
AGENT
Wade Koontz
ATTORNEY

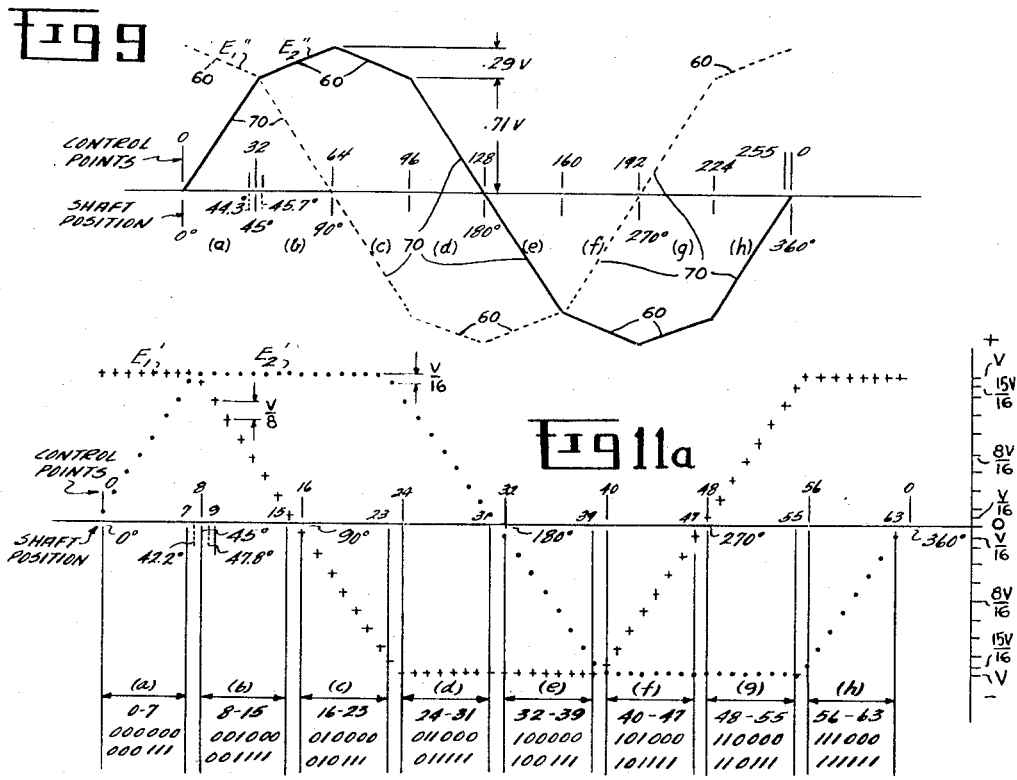

INVENTOR.
STEPHEN J. O'NEIL

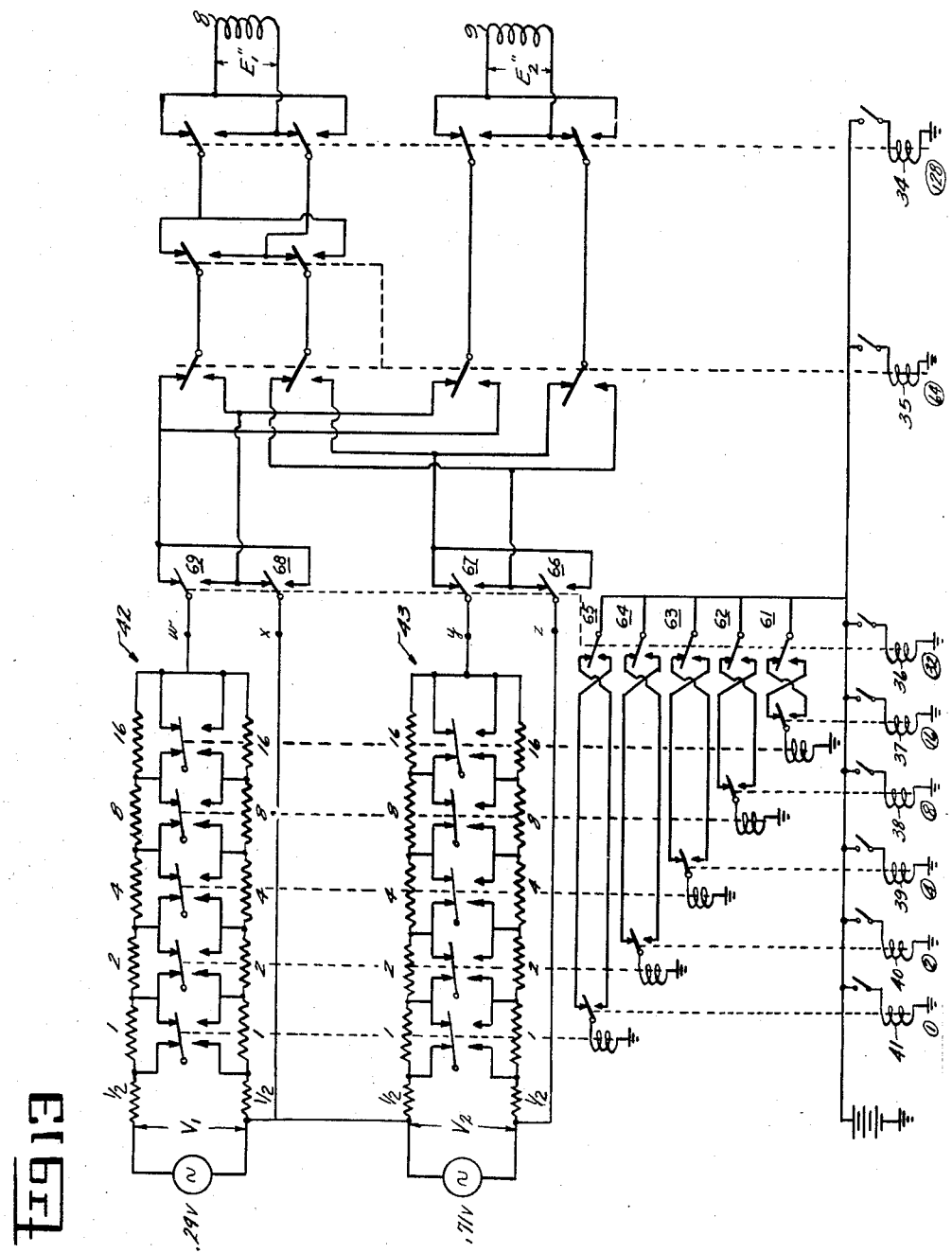

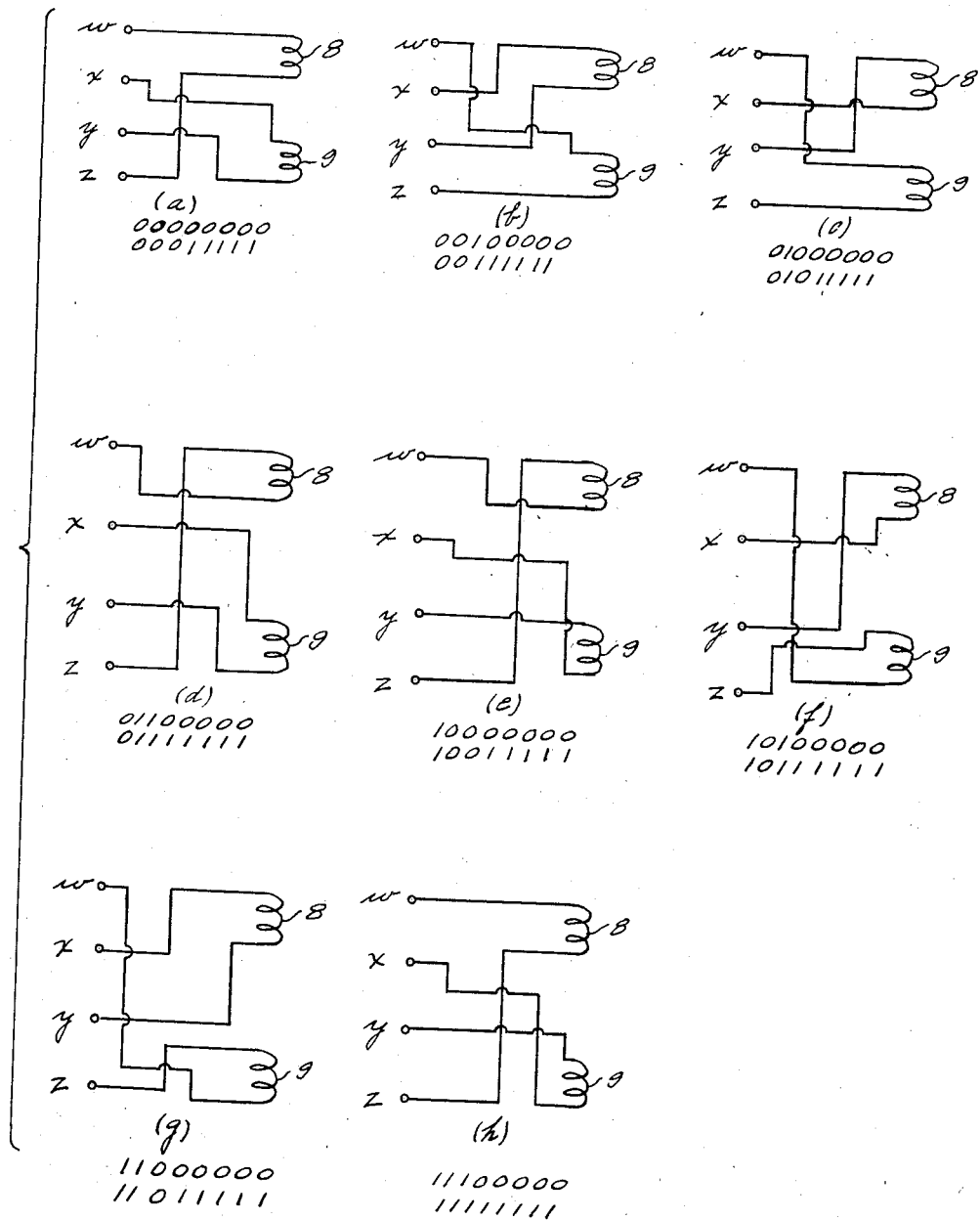

United States Patent Office 2,853,699
Patented Sept. 23, 1958

2,853,699

DIGITAL-TO-ANALOGUE SHAFT POSITION TRANSDUCER

Stephen J. O'Neil, Lexington, Mass., assignor to the United States of America as represented by the Secretary of the Air Force Application February 17, 1954, Serial No. 411,031

4 Claims. (Cl. 340—347)

(Granted under Title 35, U. S. Code (1952), sec. 266)

The invention described herein may be manufactured and used by or for the United States Government for governmental purposes without payment to me of any royalty thereon.

This invention relates to devices for converting data from digital form to analogue form and particularly to such devices in which the conversion is from digital form to the angular position of a shaft. Such a converter is useful, for example, where data received in digital form is to be indicated on a dial or where it is to be fed into an analogue computer having a rotatable shaft input.

Since the rotation of a shaft is a relatively slow process limited by the moment of inertia of the rotating member, by friction, and by the torque available to produce the rotation, it is usually necessary to introduce a parallel digit storage register from which the proper analogue outputs are derived. The derivation of a shaft position from such a parallel digit storage register is the object of this invention.

Briefly, this is accomplished by the use of a shaft positioner of the synchro or resolver type the windings of which are energized with either direct or alternating current from a digital linear voltage divider network. The adjustment of the voltage divider network and the connections between the shaft positioner windings and the network are effected in accordance with the digital input to provide energization of the shaft positioner windings of proper amplitude and proper polarity or phase to position the shaft at the point called for.

The invention will be explained in more detail in connection with the specific embodiments thereof shown in the accompanying drawings, in which Figs. 1 and 2 illustrate the general problem of a digital-to-analogue shaft position transducer;

Figs. 3 and 4 illustrate suitable shaft positioners for use in the transducer described;

Figs. 5 and 6 show voltage amplitude relations in the stator windings of the positioners of Figs. 3 and 4;

Figs. 7, 8 and 9 show linear approximations of the sinusoidal voltage amplitude functions which may be used to simplify transducer switching;

Fig. 11 shows the switching arrangement in a transducer employing the method of Fig. 8;

Fig. 11a is a graph illustrating the operation of Fig. 11.

Fig. 13 shows the switching arrangement employed with the method of Fig. 9.

Fig. 14 shows the various connections between the resolver inputs and the potential dividers in the arrangement of Fig. 13.

Figure 10:
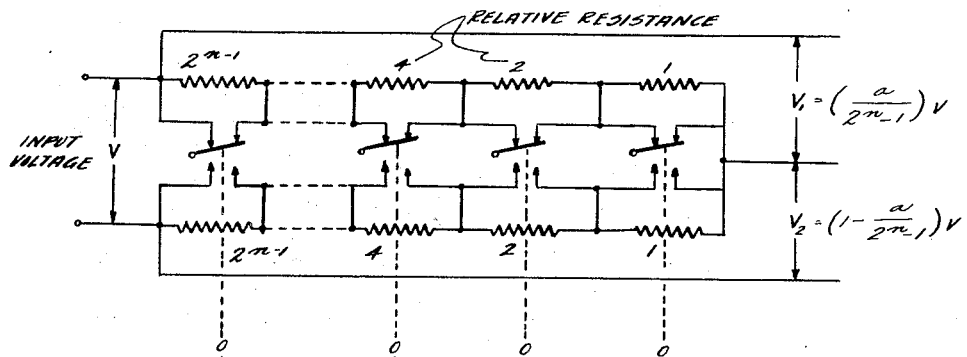
Figs. 10 and 10a show a digital linear voltage divider.

The problem solved by this invention is illustrated in a general way in Figs. 1 and 2. A parallel bank of five switches, representing a 5-digit binary code, feeds digital information to transducer 1 which converts this information into a corresponding position of shaft 2. The binary digit 1 is represented by a closed switch and the binary digit 0 by an open switch. The angle associated with any binary number is given by the expression (1) $\theta_q = a\left(\dfrac{360}{2}\right) + b\left(\dfrac{360}{2^2}\right) + c\left(\dfrac{360}{2^3}\right) + \cdots$ where $a=0$ or 1 is the most significant digit.
$b=0$ or 1 is the second most significant digit.
$c=0$ or 1 is the third most significant digit, etc.

The use of digital information results in a quantization of the angle. For instance, if five digits of a binary system are used to represent 360°, only $2^5=32$ actual angles can be represented. Each angle will therefore indicate a range of values equal to (2) $\theta_q \pm \dfrac{1}{2}\left(\dfrac{360}{2^n}\right)$ where $n$ is the number of digits used. In Fig. 2, therefore, the angle corresponding to the binary number 01010 is $$\dfrac{10}{32} \times 360° = 112.5°$$

and represents a 11.25° range of angles, as indicated by expression 2, extending from 106.875° to 118.125°.

Figs. 3 and 4 show methods of shaft positioning. In Fig. 3, network 3 is energized from source 4 and supplies alternating current energy, controlled in amplitude and phase by the binary input, to the stator windings of a synchro. A resultant flux $\phi_r$ is established by the combined action of the three windings, its angular direction depending upon the relative amplitudes and phases of the stator coil energizations. A servo system comprising two-phase motor 5 and servo amplifier 6 responds to the error signal induced in rotor coil 7 and operates to keep the rotor, which is coupled to the shaft to be positioned, in a zero error signal position. Fig. 4 shows a shaft positioner of the resolver type in which the voltage divider 3' energizes with alternating current two stator windings positioned 90° apart. By controlling the amplitudes and phases of the currents in the two windings in accordance with the binary input, the resultant flux may be made to assume any desired angular position. The rotor, carrying winding 7, is positioned in accordance with the resultant flux direction in the same manner as in Fig. 3. The voltage dividers 3 and 3' may also be energized with direct current in which case the amplitudes and polarities of the currents in the stator windings are controlled in accordance with the binary input and determine the direction of the resultant flux, which remains constant in amplitude. In the case of direct current energization, the rotor may be a permanent or electromagnet and thereby align itself with the resultant flux produced by the stator windings.

In the shaft positioners of Figs. 3 and 4 the sinusoidal voltage amplitude curves shown in Figs. 5 and 6 can be followed exactly to generate a very precise angle for a given digital input. Practically, however, this results in the use of a great number of switching elements in the voltage divider networks 3 and 3'. As already stated, the use of digital information results in the quantization of the angle so that each binary number represents the range of angles given by expression 2. Accordingly, the degree of precision of any angle derived from binary digital data is $\pm 360/2^{n+1}$ degrees, where $n$ is the number of digits used in the binary code. Therefore, for efficient overall design, the shaft-position transducer need not yield an angle to an accuracy greater than this figure.

To minimize the number of switching components it is desirable to approximate the sinusoidal voltage amplitude distributions by straight-line segments. Linear approximations of the sinusoidal voltages of Figs. 5 and 6 are shown in Figs. 7, 8 and 9. A digital-to-analogue linear voltage divider involves fewer components than a sinusoidal voltage divider since linear voltages can be subdivided into binary form and added in combinations to produce any output. A voltage divider of this type is shown in Fig. 10.

Figure 10A:
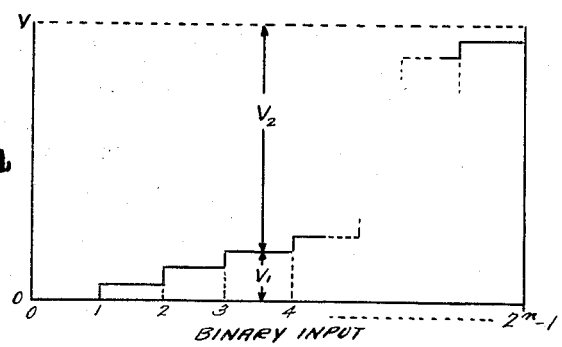

The circuit of Fig. 10 produces two different voltage outputs, $V_1$ and $V_2$, whose sum always equals the input voltage $V$. The resistance elements making up the divider have resistance values proportional to the digital values of the binary code. A switch is provided for each place of the binary number. The binary digit "0" is represented by the normal condition of its associated switch, shown in the drawing, and the digit "1" by the actuated condition. Actuation of a switch introduces the resistance of its associated resistance element into the upper half of the divider and removes an equal resistance from the lower half, causing an increase in $V_1$. The output voltage $V_1$ is therefore a linearly increasing voltage proportional to the digital input as shown in Fig. 10a. The output voltages may be expressed mathematically by the following:

(3) $$V_1 = \left(\frac{a}{2^n - 1}\right) V$$

(4) $$V_2 = \left(1 - \frac{a}{2^n - 1}\right) V$$

where $a$ is the decimal equivalent of the binary input represented by the positions of the switches.

The accuracy of this circuit depends upon the precision of the resistors in the voltage divider network and the relative impedance of the connected load. If the load impedance is not high compared with the network resistance, a cathode-follower stage may be introduced between the network and the load.

Fig. 11 shows the switching arrangement required in connection with a digital voltage divider of the above described type for energizing the two coils of a transducer type shaft positioner, such as shown in Fig. 4, in accordance with the trapezoidal approximation of Fig. 6 shown in Fig. 8. The accuracy of the method of Fig. 8 is approximately ±4.1 degrees. Therefore, this method is suitable for 5-digit or 6-digit binary codes which provide a coding precision of ±5.6 and ±2.8 degrees, respectively. A 6-digit code is used in Fig. 11 and is introduced through switches 20–25, switch 20 representing the least significant digit with a value of 1 and switch 25 representing the most significant digit with a value of 32. An open switch represents the binary digit "0" and a closed switch the binary digit "1".

The circuit of Fig. 11 corresponds to the network 3' of Fig. 4. It operates in response to an applied parallel binary code to derive from voltage source 4 values of $E_1'$ and $E_2'$ in accordance with a trapezoidal approximation (Fig. 8) of two 90° displaced sine waves (Fig. 6). As already stated, the 6-digit binary code is applied through the medium of switches 20–25, switch 20 representing the least significant binary digit with a decimal value of 1 and switch 25 representing the most significant binary digit with a decimal value of 32. The binary input is applied to the circuit by closing the proper switches, a closed switch representing the binary digit 1 and an open switch representing the binary digit 0. With a 6-digit code only 64 distinct binary inputs are possible, these ranging from the minimum binary number 000000 to the maximum binary number 111111. Each of the 64 binary inputs produces a distinct relation between the voltages $E_1'$ and $E_2'$ and therefore a distinct angular position of the output shaft (attached to rotor coil 7 in Fig. 4).

Fig. 11a shows the precise values and the phases of $E_1'$ and $E_2'$ for each of the 64 binary inputs. The amplitudes of $E_1'$ and $E_2'$ relative to the voltage $V$ of source 4 are indicated along the vertical axis. Each of the voltages $E_1'$ and $E_2'$ has one of two opposite phases represented by + phase above and − phase below the horizontal axis. The 64 inputs are indicated along the horizontal axis as control points numbered 0–63, corresponding to the decimal values of the binary numbers. The nominal angular position of the output shaft is also indicated in degrees along the horizontal axis. Hence a binary input of 001000 (8) produces a nominal shaft position of 45°. The horizontal axis of Fig. 11a is also divided into octants, designated a–h, each containing eight binary input numbers. It will be noted that the relationship between $E_1'$ and $E_2'$ in each octant is different from that in any of the other octants. For example, these differences for several of the octants are illustrated in the following tabulation:

| Octant | $E_1'$ | | $E_2'$ | |
|---|---|---|---|---|
| | Amp. | Phase | Amp. | Phase |
| (a) | constant | + | increasing | + |
| (b) | decreasing | + | constant | + |
| (c) | increasing | − | constant | + |
| (d) | constant | − | decreasing | + |

The voltages $E_1'$ and $E_2'$ applied to windings 8 and 9 are derived from terminals $x$, $y$ and $z$ of the digital voltage divider 26. The varying voltages in each octant are taken from the terminals $x$—$y$ and the constant voltages from terminals $x$—$z$. Since each of the voltages $E_1'$ and $E_2'$ may be either constant or varying depending upon the binary input, means must be provided for selectively connecting coils 8 and 9 to terminals $x$—$y$ and $x$—$z$. Also, since the phase of each voltage may be either + or −, means must be provided for selectively connecting each of coils 8 and 9 to terminals $x$—$y$ and $x$—$z$ in either of the two possible phases. This involves means for reversing the connections between the coils and the terminals. The necessary switching for the foregoing conditions is provided by relays 27, 28 and contacts 50 and 51 of relay 29. Another condition to be met is that voltages $E_1'$ and $E_2'$ must be capable of both direct and inverse amplitude variation with respect to binary input. Examples of direct variations appear in octants $a$, $c$ and $g$ where the amplitude of the voltages increases with increasing binary input. Octants $b$, $d$ and $f$ provide examples of inverse variations in which the amplitude of the voltage decreases with increasing binary input. This condition is provided for by contacts 52, 53 and 54 of relay 29. When relay 29 is deenergized, actuation of switches 20, 21 and 22 energizes relays 55, 56 and 57 which causes the voltage between terminals $x$—$y$ to increase. On the other hand, when relay 29 is energized, relays 55, 56 and 57 are energized with switches 20, 21 and 22 open causing maximum voltage at terminals $x$—$y$. As switches 20, 21 and 22 are closed relays 55, 56 and 57 are deenergized resulting in a decreasing voltage at terminals $x$—$y$.

The digital voltage divider consists of two identical arms connected between terminals $x$—$y$ and $y$—$z$. Each arm contains series connected resistors each having a value twice that of the adjacent lower resistor and ½ that of the adjacent higher resistor, the relative values in the specific example being ½, 1, 2 and 4. As shown in Fig. 11 relays 55, 56 and 57 are provided for always shorting the resistors of relative values 1, 2 and 4 in one or the other of the voltage divider arms so that the total relative resistance between $x$—$z$ is constant and equal to 8. These relays are in turn controlled by switches 20, 21 and 22 representing the three least significant digits of the binary input. The three least significant digits therefore control the voltage appearing between terminals $x$—$y$. For reasons which will be apparent later, the maximum relative resistance between terminals $x$—$y$ should be less than the relative resistance between $x$—$z$ by ½ the minimum step variation of the relative resistance between $x$—$y$, and the minimum relative resistance between $x$—$y$ should be ½ the minimum step variation. In the specific example shown the minimum step variation is 1 and the $x$—$z$ resistance is 8. Therefore, the maximum $x$—$y$ resistance should be 7½ relative and the minimum ½ relative. This result is achieved by the resistors of ½ relative value in the two arms of the voltage divider. As seen in Fig. 11 and as stated above, the relative resistance between terminals $x$—$z$, regardless of the condition of relays 55, 56 and 57, is 8. Therefore the minimum $x$—$y$ voltage is $$\frac{1}{2} \cdot \frac{V}{8} = \frac{V}{16}$$

and the maximum $x$—$y$ voltage is $$7\frac{1}{2} \cdot \frac{V}{8} = \frac{15V}{16}$$

as illustrated in Fig. 11a, the varying voltages in this figure being taken from the terminals $x$—$y$ of Fig. 11.

Figure 12:
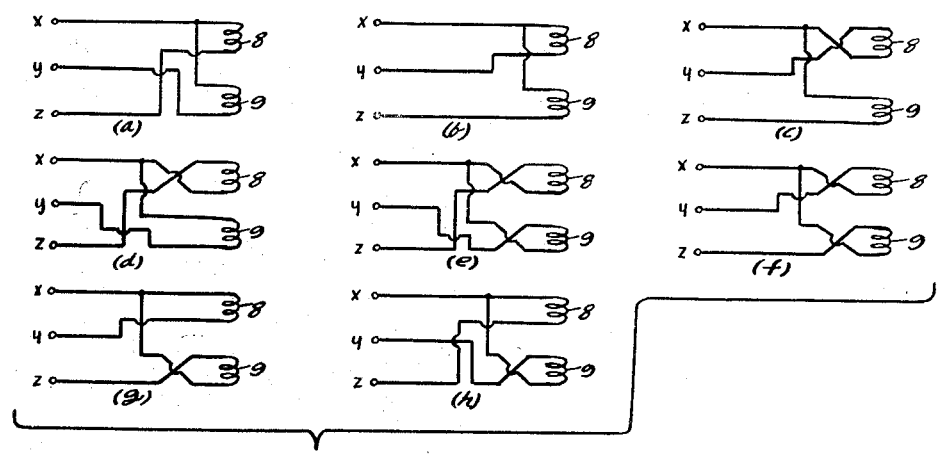
Fig. 12 shows various connections effected by the arrangement of Fig. 11.

The operation of Fig. 11 can best be understood through a step-by-step analysis in connection with Fig. 11a. Starting with the minimum binary input 000000, representing 0° shaft position, switches 20–25 are open for this binary input and relays 55, 56 and 57 are de-energized. Also, coil 8 is connected to terminals $x$—$z$ in + phase and coil 9 to terminals $x$—$y$ in + phase, as may be seen at $a$ in Fig. 12, which shows the connections between these coils and terminals $x$—$y$—$z$ in each of the eight octants. Accordingly, $E_1'$ has a value of V and $E_2'$ a value of $$\frac{V}{16}$$

as shown in Fig. 11a. As the binary input increases $E_2'$ increases until for the binary input 000111 (7) $E_2'$ has its maximum value in octant $a$ of $$\frac{15V}{16}$$

as seen in Fig. 11a. Throughout octant $a$ $E_1'$ was maintained at the constant value V.

It will be noted that only switches 20, 21 and 22 were involved in progressing from the binary input 000000 to the binary input 000111. It will also be noted that each change in the binary input by 1 changed the voltage $E_2'$ by $$\frac{V}{8}$$

and that this change in voltage served to produce a one step change in shaft position. Binary input 000111 (7) is the last in $a$ octant. Increasing this input by 1 produces the binary input 001000 (8) which is the first input of octant $b$. For octant $b$, in which the binary inputs range from 001000 (8) to 001111 (15), switch 23 is closed and switches 24 and 25 are open. With switch 23 closed relay 29 is energized causing coil 8 to be connected to terminals $x$—$y$ in + phase and coil 9 to be connected to terminals $x$—$z$ in + phase as shown at $b$ in Fig. 12. Further energization of relay 29 conditions the voltage divider 26 for decreasing voltage at terminals $x$—$y$ in the manner already explained. For the binary input 001000 (8) switches 20, 21 and 22 are open. Consequently, $E_1'$ has a value of $$\frac{15V}{16}$$

and $E_2'$ has a value of V as shown in Fig. 11a. Comparing these values with the values at point 7 it is seen that increasing the binary input by 1 from 000111 (7) to 001000 (8) caused $E_1'$ to be reduced from V to $$\frac{15V}{16}$$

and $E_2'$ to be increased from $$\frac{15V}{16}$$

to V. These changes in the voltages applied to windings 8 and 9 when the binary input changes from 000111 to 001000, i. e. during the transition from octant $a$ to octant $b$, cause a corresponding change in shaft position. Similar transitions occur between octants $c$—$d$, $e$—$f$ and $g$—$h$. The changes in connections between windings 8 and 9 and terminals $x$—$y$—$z$ that occur in these transitions may be observed in Fig. 12.

Somewhat different transitions occur between octants $b$—$c$, $d$—$e$ and $f$—$g$. In these cases the amplitudes of both $E_1'$ and $E_2'$ remain unchanged but the phase of one of these voltages is reversed. For example, in the transition from octant $b$ to octant $c$ $E_2'$ remains unchanged in amplitude and phase while $E_1'$ remains unchanged in amplitude but its phase is reversed. The resultant change in the direction of the flux produced by coils 8 and 9 changes the position of the output shaft. The changes in connections between windings 8 and 9 and terminals $x$—$y$—$z$ that occur in these transitions may also be observed in Fig. 12.

From the foregoing the operation of Fig. 11 may be summarized as follows:

(1) The variations of $E_1'$ and $E_2'$ within the octants are controlled entirely by the three least significant digits of the binary input acting through switches 20, 21 and 22 and relays 55, 56 and 57.

(2) Whether the variations in (1) are directly or inversely related to the binary input is determined by contacts 52, 53 and 54 of relay 29 which is controlled through switch 23 by the fourth digit of the binary input.

(3) For each octant, relays 27, 28 and 29 (contacts 50 and 51), controlled by the three most significant digits of the binary input through switches 25, 24 and 23, establish the proper connections between windings 8 and 9 and terminals $x$—$y$—$z$. These connections govern the phases of $E_1'$ and $E_2'$ and determine which of these voltages will be constant and which varying.

(4) In transitions between octants involving a switch between $E_1'$ and $E_2'$ as to which is constant and which is varying, the difference between the constant value and maximum varying values of these voltages, established by the resistors of ½ relative value in the digital voltage divider, result in a change in the values of $E_1'$ and $E_2'$ which produce a change in shaft position. In transitions involving a reversal of the phase of the minimum value of the varying voltage, this minimum voltage is established by the resistor of ½ relative value in the digital voltage divider at such level that the phase reversal results in a shift of the shaft position which is substantially the same as the shift produced by a one step variation of the varying voltage with the octant.

Considering the operation of Fig. 11 for a specific binary input, assume that it is desired to position the shaft at the point called for by binary number 010100 (decimal 20), nominally 112.5°. The settings of switches 20–25 for the input are as follows:

| Binary Digit | Switch No. | Condition |
|---|---|---|
| (most significant) 0 | 25 | open. |
| 1 | 24 | closed. |
| 0 | 23 | open. |
| 1 | 22 | closed. |
| 0 | 21 | open. |
| 0 | 20 | open. |

Under these conditions relay 28 is energized, causing contacts 80, 81, 82, and 83 to be in their lower positions, and relay 30 is energized causing contact 84 to be in its lower position. With contact 84 in its lower position voltage is applied through upper contact 54 and lower contact 84 to relay coil 57 causing bridging contact 85 to move to its lower position. The upper terminal of coil 8 is connected to terminal $y$ through upper contact 86, lower contact 81, lower contact 82 and upper contact 51. The lower terminal of coil 8 is connected to terminal $x$ through upper contact 87 and lower contact 80. The upper terminal of coil 9 is connected to terminal $x$ through upper contact 88. And the lower terminal of coil 9 is connected to terminal $z$ through upper contact 89, lower contact 83 and upper contact 50. These connections between coils 8 and 9 and terminals $x$, $y$ and $z$ will be seen to agree with diagram $c$ in Fig. 12 since the binary number and corresponding angle specified lie in the ($c$) octant of Fig. 11$a$.

A greater degree of shaft positioning accuracy, with a corresponding increase in switching complexity, can be obtained by use of the multislope linear approximation of the sinusoidal functions of Fig. 6 shown in Fig. 9. This method has an accuracy of approximately ±0.4 degree and is therefore suitable for use with an 8-digit code, which is precise to ±.07 degree, or a 9-digit code, which is precise to ±0.35 degree. Fig. 13 shows the required switching arrangement for an 8-digit code. The voltage functions $E_1''$ and $E_2''$ of Fig. 9 are also divisible into octants as in Fig. 8 and, accordingly, the three most significant digits of the binary code are required to accomplish the necessary octant switching through relays 34, 35 and 36. Here again, relay 36 also operates to interchange the voltages between terminals $x$—$y$ and $y$—$z$, as in Fig. 11, and also to interchange the voltage between terminals $w$—$x$, which has the value $$\left(1-\frac{a}{2^n-1}\right)V_1$$

when the relay is deenergized, with a voltage equal to $$\left(\frac{a}{2^n-1}\right)V_1$$

The remaining five digits acting through relays 37–41 and binary dividers 42—43 control the energization of windings 8 and 9 within the octants. Two dividers are required because of the two slopes occurring in Fig. 9.

Considering further the circuit of Fig. 13, the principles of operation of this circuit are the same as those described above in detail for Fig. 11 except that instead of a constant voltage V being applied to one of the windings 8 and 9 as in Fig. 11 there is applied the constant voltage $V_2$ between $x$—$z$ plus the varying voltage between terminals $w$—$x$. This arrangement is necessary in order for voltages $E_1''$ and $E_2''$ to follow the portions 60 of the approximation in Fig. 9 which, in the case of Figs. 8 and 11$a$, were flat and could be represented by a constant voltage. The approximation of Fig. 9 can be divided into octants $a$–$h$ in exactly the same way as was done in Fig. 11$a$. Similarly to Fig. 11, the five least significant digits operate relays 37–41 and have complete control over variations of $E_1''$ and $E_2''$ within the quadrants. Relay 36, controlled by the third most significant digit, operates through contacts 61—65, in the same manner as relay 29 (contacts 52—54) of Fig. 11, to establish direct or inverse relationships between the variations of $E_1''$ and $E_2''$ and the binary input as required by the particular octant. Likewise in a similar manner to that described for Fig. 11, relays 34, 35 and 36 (contacts 66—69) are controlled by the three most significant digits of the binary input and operate to establish the phases of $E_1''$ and $E_2''$ and whether these voltages will follow the slope 60 or the slope 70 (Fig. 9) as required by the particular octant. The connections between coils 8 and 9 of the resolver and terminals $w$, $x$, $y$, $z$ effected by relays 34, 35 and 36 are shown in Fig. 14 for each of the octants $a$ through $h$. Finally, the resistors of ½ relative value in digital voltage dividers 41 and 42 serve exactly the same function as their counterparts in Fig. 11 in producing an appropriate change in output shaft position for each transition between octants.

The above principles may be applied to shaft positioners of the synchro type, illustrated in Fig. 3. The approximation of Fig. 7 yields a shaft positioning accuracy of approximately ±1.1 degree which is suitable for a 7-digit binary code. The complete control function in this case is divisible into sextants rather than octants. The first three digits may be used to select a sextant thereby wasting two of the eight possible combinations of the first three digits. If this device is used over an angle of 120° or less, a straight binary system with no waste of digits is possible.

I claim:

1. A digital-to-analogue transducer for converting numbers in $n$-digit binary code into shaft positions comprising an electrical shaft positioner of the resolver type having two input circuits; a network energized by a constant voltage V and having three output terminals $x$, $y$ and $z$, the output voltage between terminals $x$—$y$ being equal to $$\frac{aV}{2^n-1}$$

and the output voltage between terminals $y$—$z$ being equal to $$\left(1-\frac{a}{2^n-1}\right)V$$

where $a$ is the decimal value of any $n$-digit binary number; means controlled in accordance with the three most significant digits of said binary code for establishing connections between said input circuits and said output terminals; means for varying the values of said output voltages in accordance with the remaining digits of said code; and additional means controlled by the third most significant digit for interchanging said output voltages.

2. A digital-to-analogue transducer for converting any number of an $n$-digit binary code into a shaft position, comprising: an electrical shaft positioner of the resolver type having two input circuits; a voltage divider comprising two identical sections each consisting of $n$-3 series connected resistance elements having resistance values proportional to the $n$-3 least significant digits of said binary code; $n$-3 two-position switching means each arranged to short-circuit a resistance element in one of said sections in one position and to short-circuit the corresponding resistance element in the other of said sections in the other position; means connecting said sections in series; means for applying a constant voltage across said series connected sections; means controlled in accordance with the three most significant digits of said binary code for establishing connections between said input circuits and said voltage divider; means for controlling said switching means in accordance with the remaining digits of said code; and additional means controlled by the third most significant digit for simultaneously reversing the positions of said switching means.

3. A digital-to-analogue transducer for converting any number of an $n$-digit code into a shaft position comprising: an electrical shaft positioner of the resolver type having two input terminals; a network energized by constant voltages $V_1$ and $V_2$ and having four output terminals $w$, $x$, $y$ and $z$, the output voltage between terminals $w$—$x$ being equal to $$\left(1-\frac{a}{2^n-1}\right)V_1$$

between terminals $x$—$y$ being equal to $$\frac{aV_2}{2^n-1}$$

and between terminals $y$—$z$ being equal to $$\left(1-\frac{a}{2^n-1}\right)V_2$$

where $a$ is the decimal value of any $n$-digit binary number, and $V_1$ being smaller than $V_2$; means controlled in accordance with the three most significant digits of said binary code for establishing connections between said input circuits and said output terminals; means for varying the values of said output voltages in accordance with the remaining digits of said code; and additional means controlled by the third most significant digit for interchanging the output voltages between terminals $x$—$y$ and $y$—$z$, and, simultaneously, interchanging the output voltage between terminals $w$—$x$ with a voltage equal to $$\frac{aV_1}{2^n-1}$$

4. A digital-to-analogue transducer for converting any number of an $n$-digit binary code into a shaft position comprising: an electrical shaft positioner of the resolver type having two input circuits; a first voltage divider and a second voltage divider, each consisting of a pair of series connected sections, the sections of each pair being identical and consisting of $n$–3 series connected resistance elements having resistance values proportional to the $n$–3 least significant digits of said binary code; $n$–3 two-position switching means each arranged in one switch position to short circuit resistance elements of equal value in one section of each voltage divider and in the other switch position to short-circuit the corresponding resistance elements of the same value in the other section of each voltage divider; means connecting two ends of said voltage dividers together and to a first output terminal, means connecting the junction of the sections of said first voltage divider to a second output terminal, means connecting the junction of the sections of said second voltage divider to a third output terminal, and means connecting the remaining end of said second voltage divider to a fourth output terminal; means for applying a constant output voltage across the series connected sections of said first voltage divider, and means for applying a larger constant voltage across the series connected sections of said second voltage divider; means controlled in accordance with the three most significant digits of said binary code for establishing connections between said input circuits and said output terminals; means for controlling said switching means in accordance with the remaining digits of said code; and additional means controlled by the third most significant digit for simultaneously reversing the positions of said switching means.

References Cited in the file of this patent

UNITED STATES PATENTS

| | | |
|---|---|---|
| 2,023,221 | Fischer | Dec. 3, 1935 |
| 2,497,961 | Shaw | Feb. 21, 1950 |
| 2,630,552 | Johnson | Mar. 3, 1953 |
| 2,676,289 | Wulfsberg | Apr. 20, 1954 |
| 2,685,084 | Lippel et al. | July 27, 1954 |
| 2,686,282 | Salamonovich | Aug. 10, 1954 |
| 2,706,270 | Steele | Apr. 12, 1955 |
| 2,738,504 | Gray | Mar. 13, 1956 |